F. E. HANCOCK.
TROLLEY HARP AND WHEEL.
APPLICATION FILED APR. 20, 1908.
925,094.
Patented June 15, 1909.
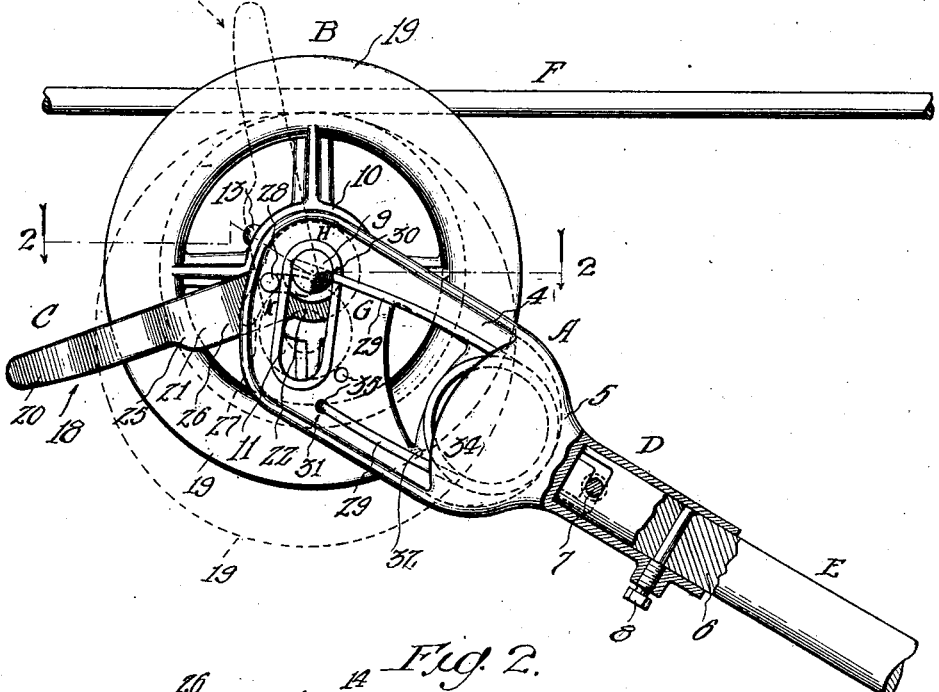
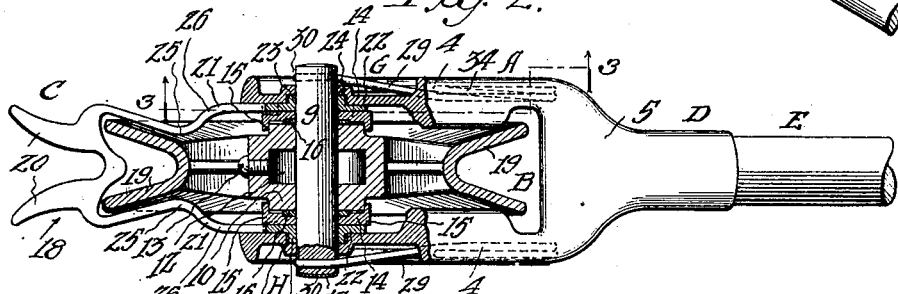
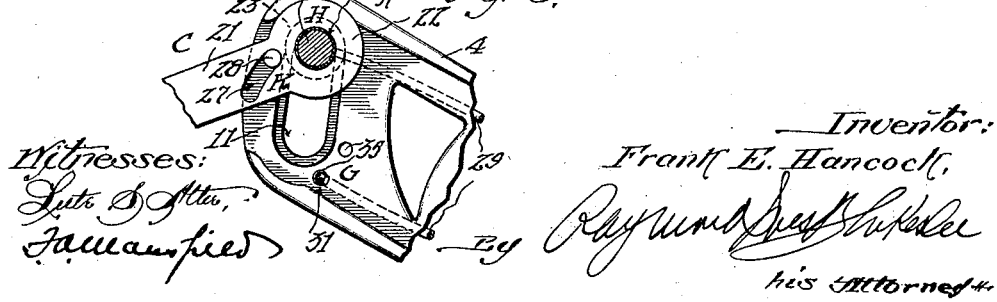
Inventor:
Frank E. Hancock,

UNITED STATES PATENT OFFICE.

FRANK E. HANCOCK, OF SHERMAN, CALIFORNIA, ASSIGNOR TO EUREKA TROLLEY HARP CO., OF HOLLYWOOD, CALIFORNIA, A CORPORATION OF CALIFORNIA.

TROLLEY HARP AND WHEEL.

No. 925,094.   Specification of Letters Patent.   Patented June 15, 1909.

Application filed April 20, 1908. Serial No. 428,296.

*To all whom it may concern:*

Be it known that I, FRANK E. HANCOCK, a citizen of the United States, residing at Sherman, in the county of Los Angeles and State of California, have invented new and useful Improvements in Trolley Harps and Wheels, of which the following is a specification.

This invention relates to trolley harps and wheels; and has for its object to provide improved electrical and mechanical connections between trolley poles and wires, which shall be superior in point of durability, positiveness in operation, maintenance of working circuit conditions, continuity of proper working mechanical conditions, facility of convenience in assembling of parts and features, and general efficiency; and which will be relatively simple and inexpensive in construction, commensurate with provision of the indispensable features establishing superiority over the showing of the prior art.

A particular object of the invention consists in the provision of a trolley harp and wheel which will be capable of standing up to the exacting requirements of long service, and which will comprise or be supplemented by auxiliary features and elements to that end and directed at prevention of inadvertent disengagement of the trolley wheel from the trolley wire.

With all the above objects in view, the invention consists in the provision, construction, combination, association, and relative arrangement of parts, elements and features, all as hereinafter set forth, as shown in the drawing, and as finally pointed out in claims.

In the drawing:—Figure 1 is a side elevation, partly broken away and partly in section for clearness of illustration of a trolley harp and wheel constructed and organized according to the invention and in service position in connection with a section of trolley wire; Fig. 2 is a transverse sectional view of the same, taken upon the line 2—2, Fig. 1, and looking in the direction of the appended arrows; and, Fig. 3 is a detail sectional view of the same, taken upon the line 3—3, Fig. 2, and looking in the direction of the appended arrows.

Corresponding parts in all the figures are denoted by the same reference characters.

Referring with particularity to the drawing, the improved trolley harp and wheel, with the adjuncts and attendant features embodying the invention, comprises a harp A, a wheel B, an anti-displacement element C; and harp attachment means D whereby the harp and other features are connected with the trolley pole E.

F designates a section of trolley wire in connection with which the wheel B and anti-displacement element C operate or have physical engagement and electrical contact in the use of the invention, and according to the working conditions which arise.

The harp A, wheel B and anti-displacement element C are so assembled and operatively connected that immediately upon the displacement of the wheel from the trolley wire F, as by the wheel coming into engagement with any obstruction upon the trolley wire, the anti-displacement element C is thrown into engagement and electrical contact with the trolley wire, maintaining the electrical circuit through the harp and the trolley pole, and keeping the tread of the wheel in alinement with the trolley wire until the obstruction is passed, so that the tension of the trolley base immediately restores the wheel to the wire. At the average speed of traverse of the trolley wire by the trolley wheel, the interim between the displacement of the wheel from the wire and its restoration thereto is of very slight duration, being practically instantaneous; but during such interim, when restoration of the wheel to the wire depends upon chance, the restoration is more apt not to occur than to occur. In other words, unless means insuring restoration of the wheel to the wire is provided, displacement of the wheel is ordinarily followed by breaking of the electrical connections between the wheel and the wire until restoration of the wheel is effected by manual effort, usually attended by considerable inconvenience and delay. In association and combination with the wheel, the harp and the anti-displacement element, I provide tension means G whereby the normal positions of the wheel and anti-displacement element relative to the trolley wire are maintained and are restored after displacement of the wheel and engagement of the anti-displacement element with the wire.

The invention also comprises certain improved bearing elements H pertaining to the mounting of the trolley wheel and its maintenance in proper conditions of service and conduction of electric current.

An improved form of provision, construction, combination, association and relative arrangement of parts, members and features is as follows:—

The harp A comprises two side members or plates 4, as usual, which are joined by socketed head 5, into which the outer end 6 of the trolley pole E fits.

7 designates a pin-and-slot or bayonet connection between the socketed head 5 and the trolley pole E, which, together with a partially threaded and headed holding-pin 8 which passes through the head 5 at one side and the trolley pole, constitute the harp attachment means D.

Comprised within the bearing elements H is an arbor or axle 9 for the wheel B, the former being passed at its end portions, exteriorly of the hub or web 10 of the wheel B, through elongated slots or openings 11 in the side plates 4 of the harp. The hub or web 10 rotates upon the arbor 9, having a central oil chamber 12 closed by a screw cap 13. To confine the lubricant to the portions of the arbor which constitute a bearing for the wheel, I provide annular caps 14 which are slipped over the opposite ends of the arbor and brought up against the hub of the wheel, each of said caps being peripherally flanged, as at 15, to insure a tight joint. Each cap 14 may be provided with a packing ring or gasket 16, surrounding the arbor and disposed between the respective cap 14 and the hub 10. I preferably provide the arbor 9 with a coating or skin 17 of enamel, or other suitable electrically insulating material; so that the path of the electric current shall not be through the arbor from the wheel to the harp.

The anti-displacement element C consists of a pronged head or fork 18, fitting closely over the grooved channeled tread 19 of the trolley wheel, and arranged to swing in an arc concentric with and but slightly greater than a commensurate arc of the said tread 19; there being sufficient space in the grooved tread 19, inward of the head 18 for the wire F were the same extended between the tread and the head 18. The latter statement of relation of parts is merely illustrative of the proximity of the head 18 to the tread 19, as the trolley wire is never extended between the same. The head 18, having convergent prongs or fingers 20, is carried by side members or arms 21, integral or otherwise rigid in structural relation thereto, said side arms 21 terminating at their inner ends in annular or centrally open heads 22 which are passed upon the end portions of the arbor 9, closely fitting the same so that said side arms have a pivotal play upon said arbor. The heads 22 may be provided each with an annular rib 23 fitting an annular recess 24 in the adjacent side plate 4 of the harp 5, further centering the anti-displacement element and producing a better contact of the parts for electric conduction. The side arms 21 are preferably inwardly bowed, as at 25, to conform to the tread formation of the wheel B, and inwardly of such portion are again outwardly bowed as at 26, into close proximity to the side plates 4 of the harp, thus preventing entrance of the trolley wire between the harp side plates and side arms 21 of the head or fork 18. Each of the side arms 21 is provided with a curved elongated slot 27 within which projects a pin 28 fixed to the respective plate 4 and arranged to traverse said curved slot as the arbor 9 traverses the elongated slots 11, in the relative movement of the harp and the wheel, and of the wheel and the anti-displacement element. The operative connection consisting of the slot 27 and pin 28 constitutes means K for throwing the anti-displacement element into operative position, in engagement with the wire, during the displacement of the wheel.

The tensional means G may comprise two lengths 29 of spring wire, each of which lengths is connected with one end of the arbor 9, by being passed through an opening in the same, as at 30, and the other end of which is projected through and held in an opening in the adjacent side plate 4 of the harp, as at 31; the central portion of each of such lengths of wire being centrally coiled, as at 32, and disposed within a pocket or chamber beneath a cheek 34 formed upon the respective side plate 4; the central coiling of each length of wire increasing its tensional efficiency; and such tensional efficiency may be varied by varying the point of connection of the end of the wire which is connected with the harp side plate 4, as at 31, a plurality of holes 35 being formed in each side plate 4 to this end. Each tension means G is arranged exteriorly of the respective side plate 4, thus enabling convenient assembling and unassembling of the harp, wheel, anti-displacement element, arbor and tension means.

The operation, method of use and advantages of the improvement in trolley harps and wheels constituting the invention will be readily understood from the foregoing, taken in connection with the accompanying drawings and the following statement:—In assembling the parts and features of the construction, the caps 14 and gaskets 16 are fitted to the hub of the wheel, the heads 22 of the side arms 21 of the pronged head 18 are fitted against the caps 14, and the parts so assembled are slipped or sprung between the side plates 4 of the harp. The arbor or axle 9 is then passed through the registering openings in the parts aforesaid, including the elongated slot 11, the pins 28 having previously been projected into the slots 27. The ends of the length of wire 29 constituting the two members of the tensional means G are now respectively detachably connected with the ends of the arbor 9 and the holes 35 in the side plates 4 of the harp. Said tension means maintain the arbor 9 at the upper extremities of the elongated slot 11, which slots are formed transversely of the side plates 4 of the harp, with a proper angularity with respect to the longitudinal axis of the trolley pole. With the arbor in this position, the wheel is maintained in elevated position, being the normal position for its engagement with the wire; and the forked head 18 of the anti-displacement element C is maintained in normal or depressed position, the pins 28 lying at the upper extremities of the curved slots 27, which latter are formed in proper extension substantially transversally of the side arms 21 of the head 18. The moment that the wheel comes into engagement with an obstruction upon the wire, or in fact in its path of travel, the wheel is depressed against the tension means G, the arbor 9 traversing the elongated slots 11 downwardly, and the head 22 of the side arms 21 of the prong head 18 are carried downwardly with the arbor 9, the means K consisting of the pin 28 and curved slots 27, causing the pronged head 18 to be thrown upward into operative position into engagement with the wire, maintaining circuit conditions, and keeping the wheel centered with respect to the wire, so that, the obstruction passed, the tension means G, together with the tension of the trolley base, restore the wheel to the wire, the pronged head 18 returning to normal depressed position, under the influence of the tension means G and the control of the curved slot 27 and pin 28 constituting the means K, which latter thus act both in throwing the anti-displacement element C into operative position and in restoring the same to normal position. The inconvenience and delay usually attending the displacement of the trolley wheel from the wire and its restoration thereto are obviated by the employment of the anti-displacement element C and its association with the trolley harp and trolley wheel and the tension means G.

The caps 15 and gaskets 16 effectually confine the lubricant of the arbor to the bearing portions of the same and of the hub of the wheel; and the insulation of the arbor afforded by the enamel or equivalent coating or skin 17 keeps the arbor out of the electrical path, preventing overheating of the arbor by its resistance to the current, and the consequent tendency to burn up the lubricant. The electrical path is through the wheel, through the cap, through the side arms 21 of the anti-displacement element, and then through the side plates 4 of the harp and the socketed head 5 of the latter into the pole E. The attachment means D comprising the bayonet connection at 7 and the threaded pin connection at 8 enable convenient connection and disconnection of the harp and pole; and the method and means of connection of the wheel, harp, anti-displacement element and tension means provide for convenient and expeditious assembling and unassembling of the essential features of the construction.

In conclusion, I do not desire to be understood as limiting myself to the specific construction, combination, association, relative arrangement and provision of parts, elements and features shown and described; but reserve the right to vary the same, in adapting the improvements to varying conditions of use, without departing from the spirit of the invention or the terms of the following claims.

Having thus described my invention I claim and desire to secure by Letters Patent:—

1. A harp having side plates provided with elongated slots, a wheel having an arbor movable in said elongated slots, an anti-displacement element comprising a head provided with side arms loosely connected with said arbor; and said side plates being provided with pins entering curved slots in said side arms of said head; and tension means bearing upon said arbor.

2. A trolley harp provided with side plates, a trolley wheel between the side plates and having an oil chamber in the hub thereof; an arbor passing through the hub of the wheel and said side plates; and caps upon the arbor between the hub of the wheel and said side plates, said caps confining the lubricant to the bearing portions of the arbor and the hub of the wheel.

In testimony whereof, I have signed my name to this specification in the presence of two subscribing witnesses.

FRANK E. HANCOCK.

Witnesses:
  E. C. THORNTON,
  GEO. T. SHERMAN.